A. J. GILLESPIE.
IRREGULAR MECHANISM OF VOTING MACHINES.
APPLICATION FILED APR. 7, 1906.
945,714.
Patented Jan. 4, 1910.
10 SHEETS—SHEET 3.
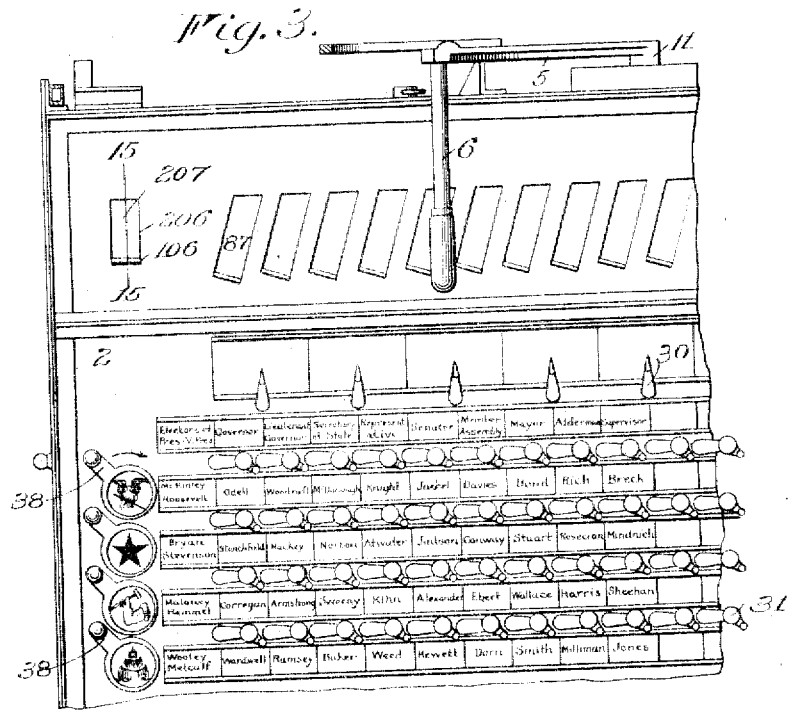
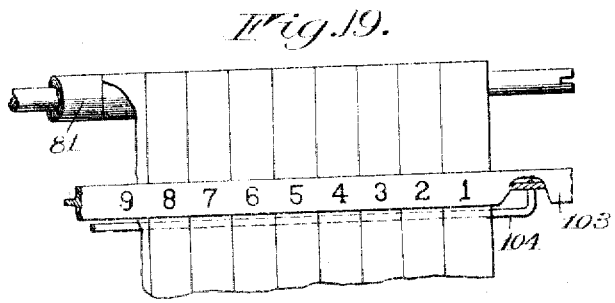
WITNESSES:
INVENTOR

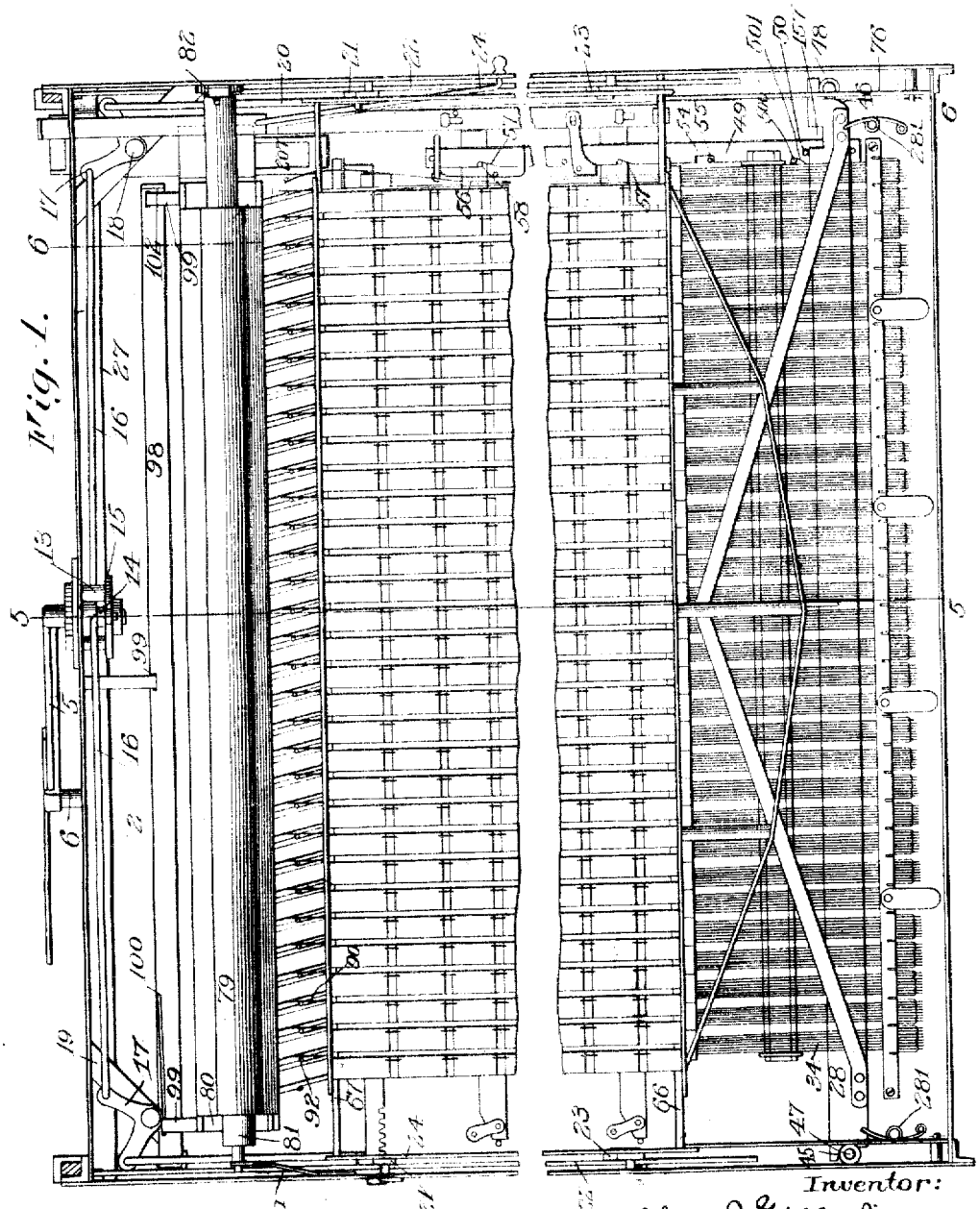

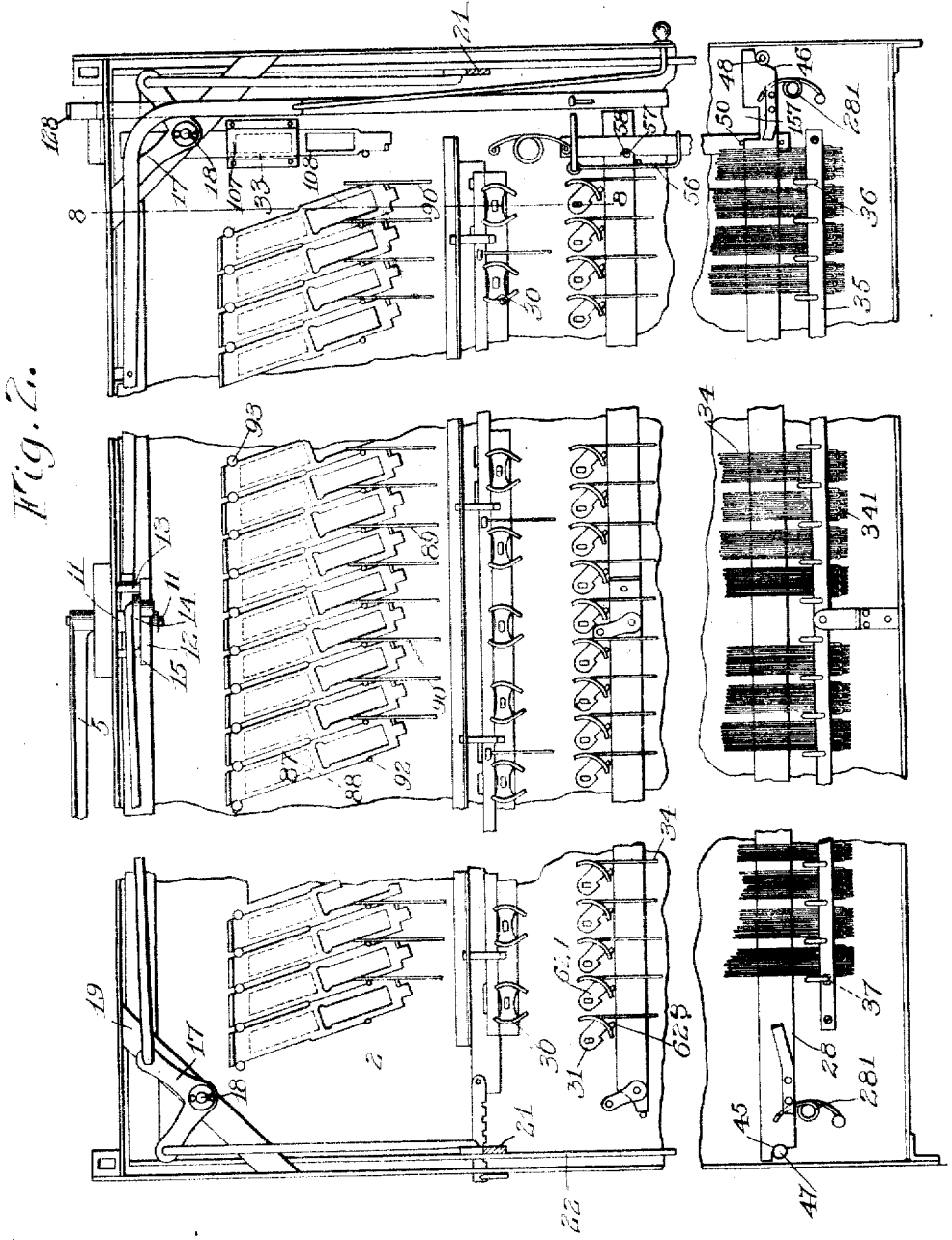

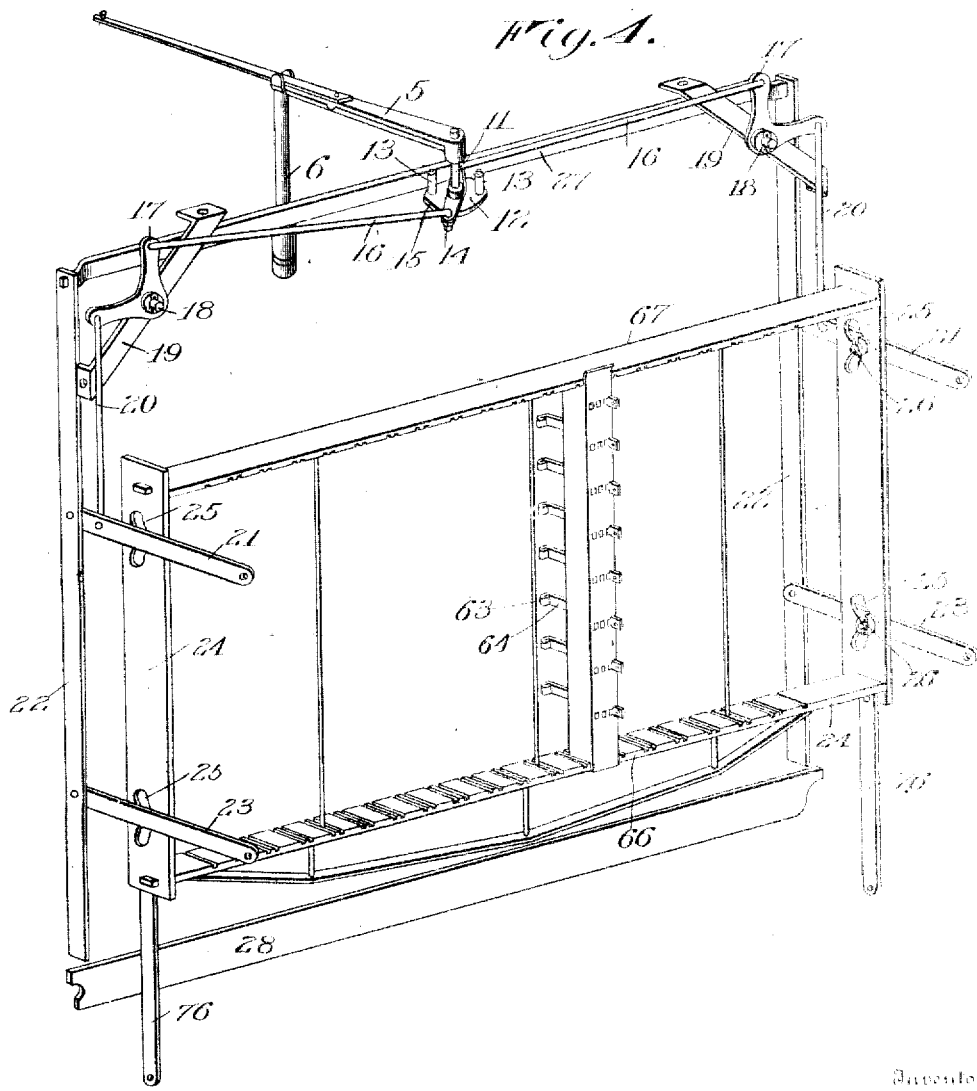

A. J. GILLESPIE.
IRREGULAR MECHANISM OF VOTING MACHINES.
APPLICATION FILED APR. 7, 1906.

945,714.

Patented Jan. 4, 1910.
10 SHEETS—SHEET 5.

Witnesses
Walter B. Payne
Clarence A. Batty

Inventor
Alfred J. Gillespie
by
Frederick H. Church
Attorney

A. J. GILLESPIE.
IRREGULAR MECHANISM OF VOTING MACHINES.
APPLICATION FILED APR. 7, 1906.
945,714.
Patented Jan. 4, 1910.
10 SHEETS—SHEET 6.
Fig. 6.
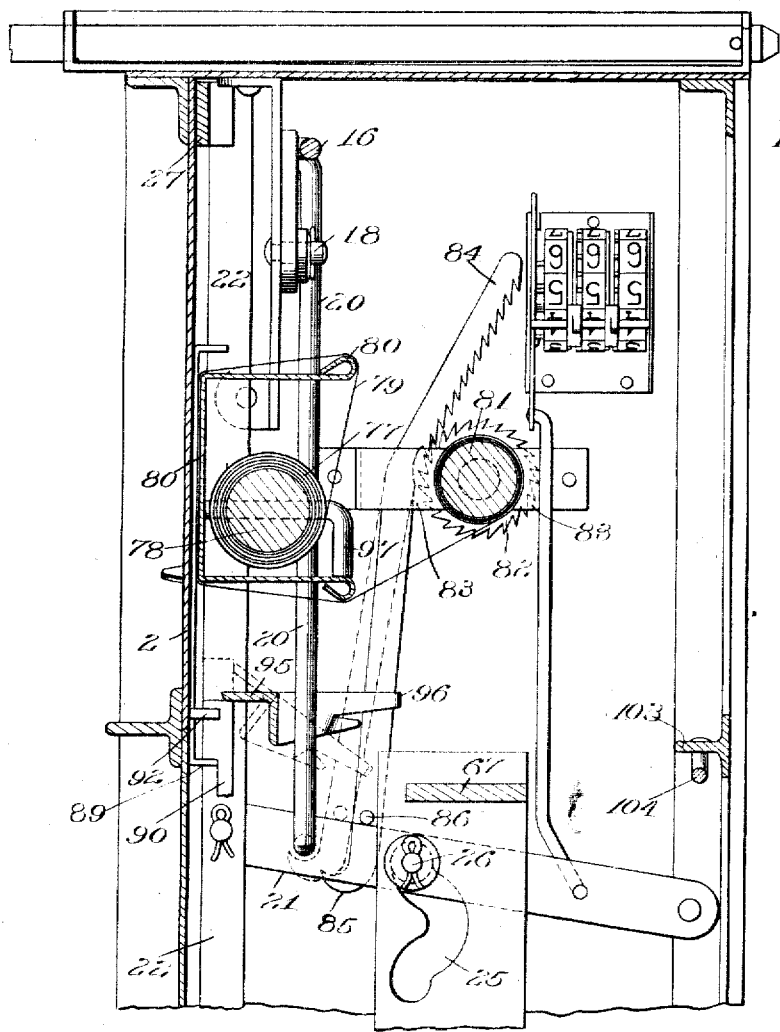
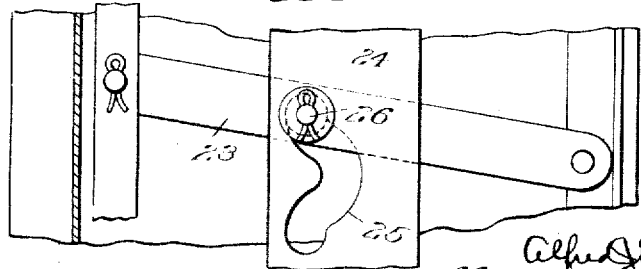
Witnesses
Walter B. Payne
Inventor
Alfred J Gillespie
Attorney A. J. GILLESPIE.
IRREGULAR MECHANISM OF VOTING MACHINES.
APPLICATION FILED APR. 7, 1906.

945,714.

Patented Jan. 4, 1910.
10 SHEETS—SHEET 7.

A. J. GILLESPIE.
IRREGULAR MECHANISM OF VOTING MACHINES
APPLICATION FILED APR. 7, 1906.

945,714.

Patented Jan. 4, 1910
10 SHEETS—SHEET 8.

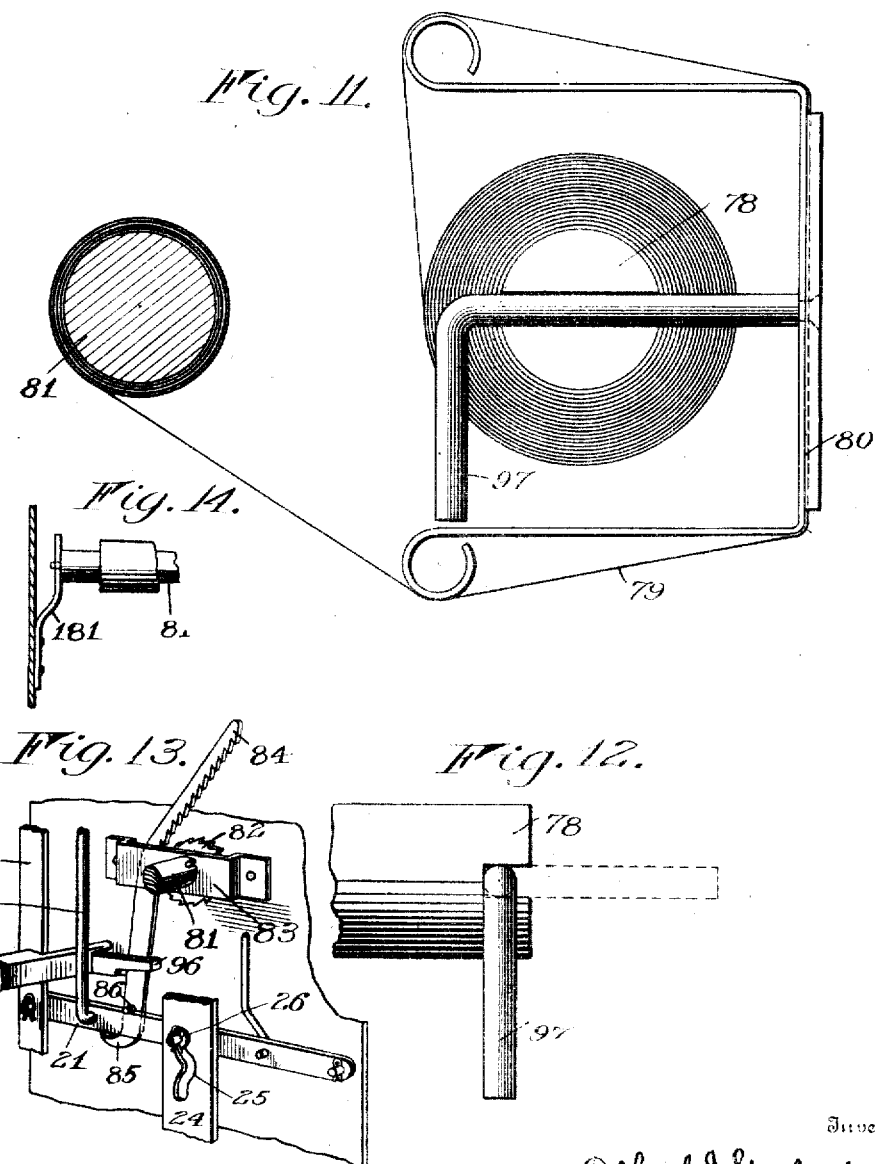

A. J. GILLESPIE.
IRREGULAR MECHANISM OF VOTING MACHINES.
APPLICATION FILED APR. 7, 1906.
945,714.
Patented Jan. 4, 1910.
10 SHEETS—SHEET 10.
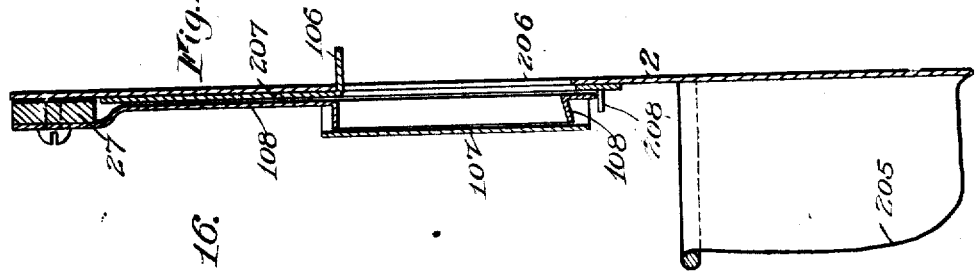
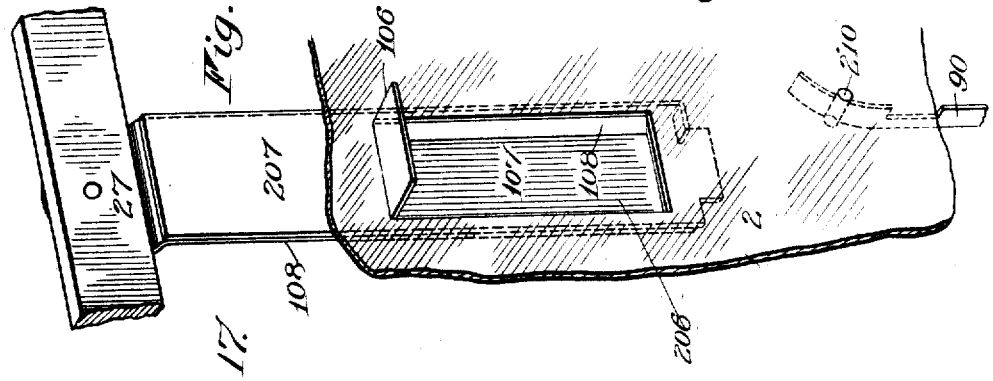
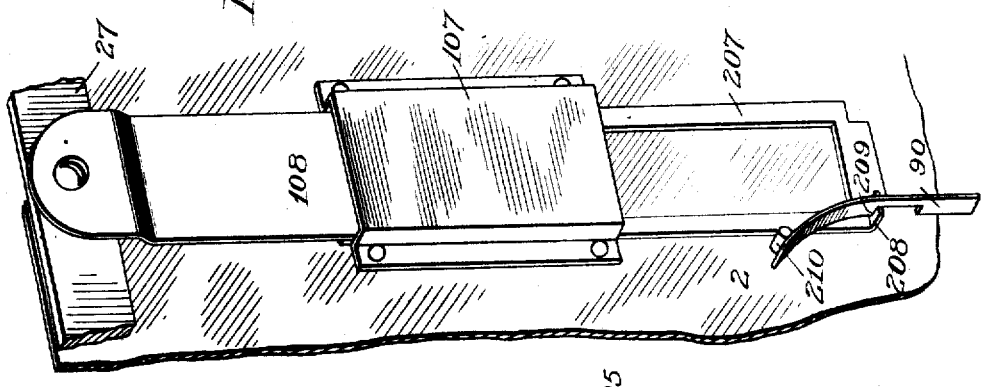

UNITED STATES PATENT OFFICE.

ALFRED J. GILLESPIE, OF ATLANTIC, IOWA, ASSIGNOR, BY MESNE ASSIGNMENTS, TO EMPIRE VOTING MACHINE COMPANY, OF ROCHESTER, NEW YORK, A CORPORATION OF NEW YORK.

IRREGULAR MECHANISM OF VOTING-MACHINES.

945,714. Specification of Letters Patent. Patented Jan. 4, 1910.

Original application filed June 28, 1902, Serial No. 113,686. Divided and this application filed April 7, 1906. Serial No. 310,432.

*To all whom it may concern:*

Be it known that I, ALFRED J. GILLESPIE, of Atlantic, in the county of Cass and State of Iowa, have invented certain new and useful Improvements in Irregular Mechanism of Voting-Machines; and I do hereby declare the following to be a full, clear, and exact description of the same, reference being had to the accompanying drawings, forming a part of this specification, and to the reference-numerals marked thereon.

My present invention relates to improvements in voting machines, and particularly of the type contained in my prior application, Serial No. 113,686, and its object is to provide an improved and efficient mechanism for receiving and recording all votes cast for parties not regularly nominated.

To these and other ends the invention consists in certain improvements and combinations of parts, all as will be hereinafter more fully explained, the novel features being pointed out in the claims at the end of the specification.

Figure 5:
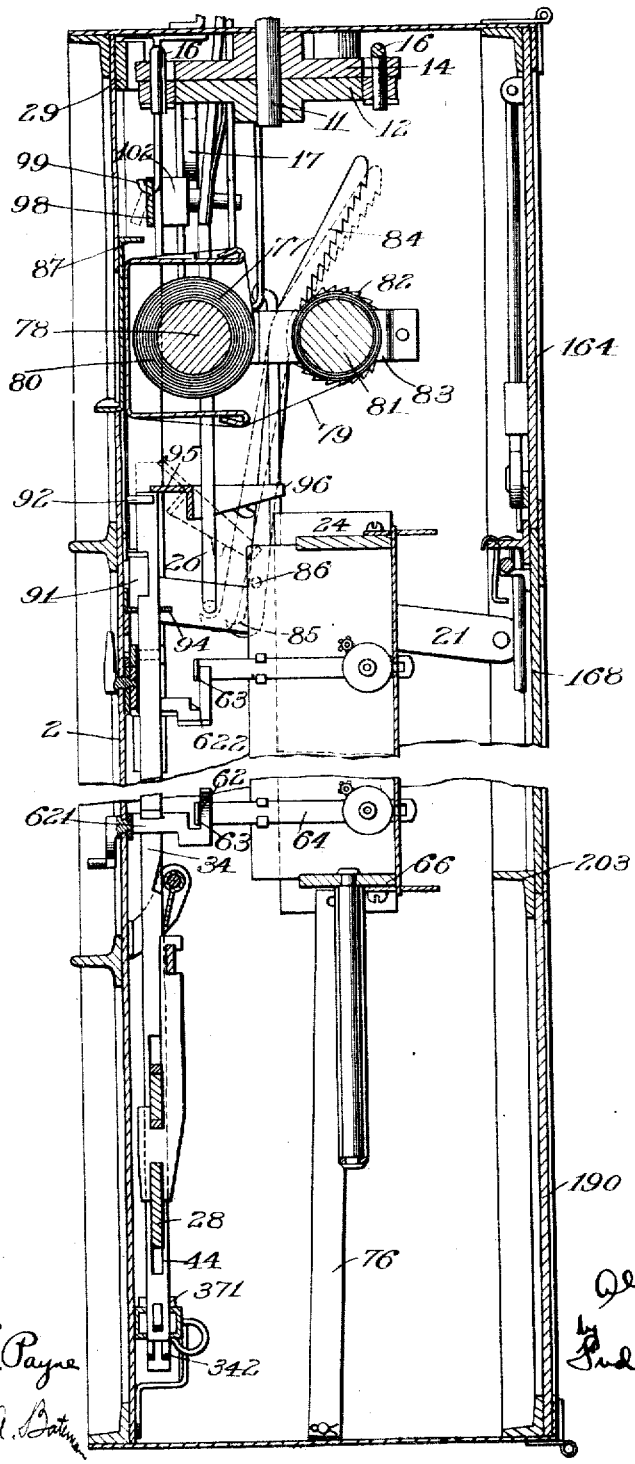
Figure 7:
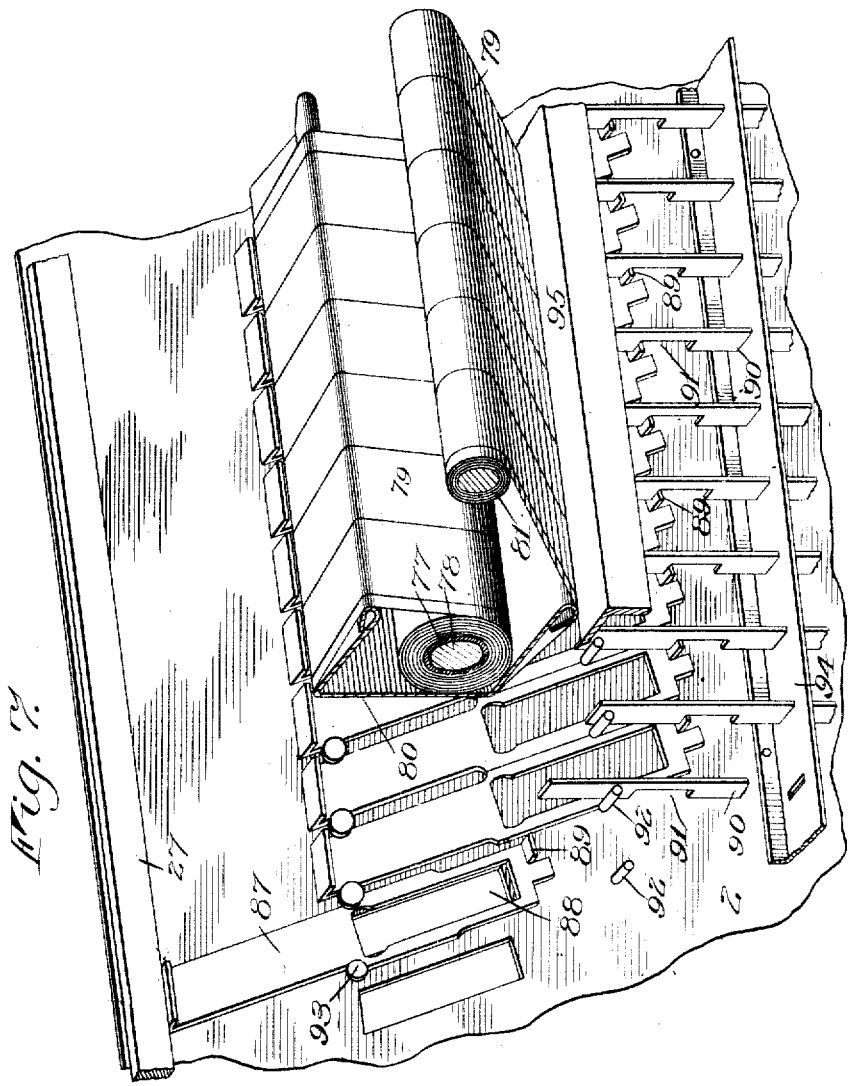
Figure 8:
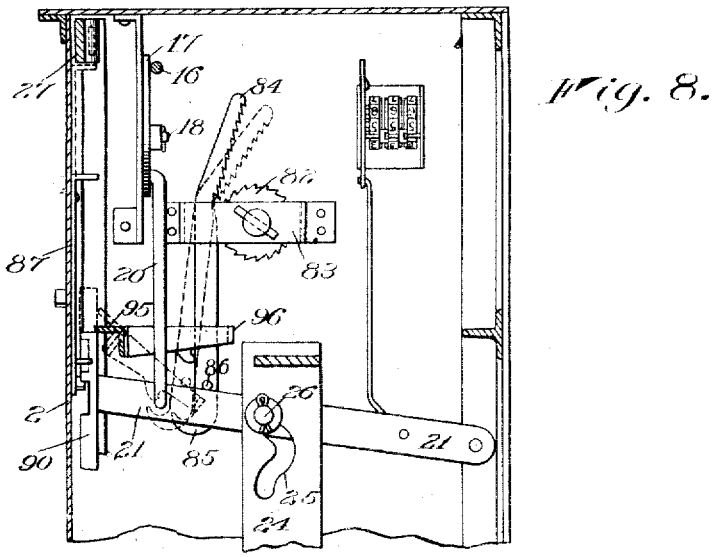
Figure 9:
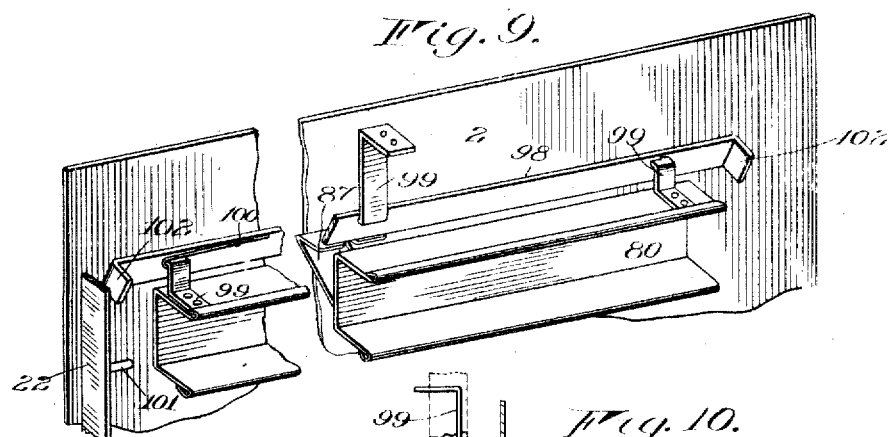
Figure 10:
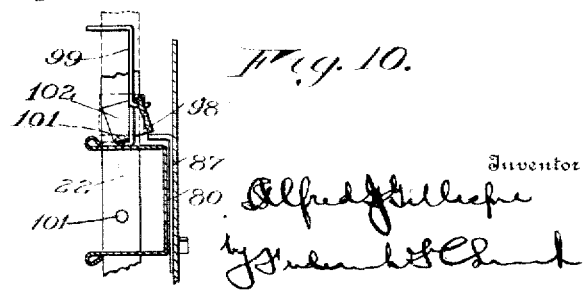

In the accompanying drawings: Figure 1 is a view of the machine looking from the rear with the doors or covers removed. Fig. 2 is a rear elevation with the rear doors, registers of counters and their supports and the irregular ballot roll removed. Fig. 3 is a front elevation of a portion of the front plate or key board of the machine. Fig. 4 is a perspective view of the mechanism for operating the register frame removed from the casing. Fig. 5 is a vertical sectional view on the line 5—5 of Fig. 1, with the rear doors of the casing closed. Fig. 6 is a vertical sectional view taken on the line 6—6 of Fig. 1 showing the operating mechanism for the paper roll. Fig. 7 is a perspective view looking from the rear showing the irregular ballot slides and the paper roll in section. Fig. 8 is a vertical sectional view on the line 8—8 of Fig. 2. Fig. 9 is a detailed perspective view of the mechanism for locking the irregular ballot slides. Fig. 10 is a vertical sectional view of the same. Fig. 11 is an enlarged end elevation of the paper roll frame and the securing device therefor showing the paper winding roll in section. Fig. 12 is a rear elevation of the end of the paper roll showing the securing devices therefor. Fig. 13 is a perspective view of the mechanism for causing the operation of the paper roll of the irregular ballot mechanism. Fig. 14 is a rear elevation of the left hand end of the paper roll and its holding device. Fig. 15 is a vertical sectional view taken on the line 15—15 of Fig. 3, showing the mechanism for voting a split electoral ticket. Figs. 16 and 17 are perspective and sectional views looking from the front and rear respectively, showing the parts illustrated in Fig. 15. Fig. 18 is a view of one of the casings for containing the written or printed electoral ticket to be used in connection with the devices shown in Figs. 15 to 17 inclusive. Fig. 19 is a perspective view looking from the rear showing the paper guide used when transcribing the irregular ballots.

Similar reference numerals in the several figures indicate similar parts.

The machine embodying my present invention is shown in my prior application aforesaid, of which this application is a division, said machine embodying generally a casing suitably supported upon legs and having at the front a key board or plate 2 upon which the ballot indicators or keys and the other parts accessible to the voter are mounted, the operating and registering mechanism being arranged within the casing and covered during use of the machine by suitably hinged doors, three being shown in the present instance, the upper door 164 being hinged to the upper rear edge of the casing and swinging upwardly, the middle door 168 being hinged to the cross bar or rail 203 and the lower door 190 being hinged to the lower edge of the casing and swinging downwardly also. The front of the machine is, as usual, covered during the voting operations by curtains or closures carried by a rail or support 3 arranged at some distance from the casing, having the rearwardly-extending ends fitting and removably secured in sockets arranged at the top thereof. The curtain is operated by a curtain lever 5 provided with a handle 6.

As in my prior application aforesaid, the devices capable of operation by the voter for indicating his choice are arranged generally upon the front plate 2 of the machine as shown in Fig. 3 in which 87 indicates the slides or doors controlling access to the paper on which the names of the persons not nominated may be written to enable them to vote for candidates not regularly nominated, 30 indicates the indicators or keys for questions for and against any proposition as, for instance, an appropriation; 31 indicates keys or indicators for the regularly nominated candidates for an office and 38 indicates the straight ticket keys or indicators by means of which votes for all the candidates nominated by a particular party may be indicated, the indicators for questions and the regularly nominated candidates, however, being shown herein to show their relation with the irregular voting devices.

As in my prior patents the keys or indicators are movable into and out of voted position without causing the actuation of their corresponding registers, the operation of the registers and the resetting of the machine for subsequent voters being caused by the movement of the curtain lever by the following means. The shaft 11 to which the curtain lever 5 is attached extends downwardly through the top of the casing and at its lower ends has a bearing in a stationary cam or guide plate 12 separated from the top of the casing by studs 13. Immediately above this plate and keyed to the shaft 11 is a double crank or lever 14 having at its outer ends small slots or apertures in which are the pin or bent ends of connecting rods or links 16, said links being pivoted at their outer ends to the bell crank levers 17 pivoted at 18 on the diagonal braces at the upper corners of the casing. As shown in Fig. 6, the studs 13 contact with and limit the motion of the double crank 14 and the ends of the links 16 extend through the apertures in the crank and are arranged to coöperate with the edge of the plate 12. This plate 12 is curved on two sides substantially concentric with the shaft 11 so as to cause the ends of the links to remain at the extreme ends of the cranks during a portion of the oscillation of the shaft, and is cut away at 15 at the sides so that as the ends of the double crank 14 advance around the round portion of the cam plate the links 16 will be driven away from each other, but when the cutaway portion of the plate is reached the outward movement of the links is arrested, and the last portion of the movement of the crank 14 until arrested by the pins 13, does not move the links 16, but the ends of the latter are prevented from independent movement toward the shaft 11 by the edges of the plate 12.

Pivoted to the outer ends of the bell crank lever 17 are depending links 20 connected to levers 21 pivoted at their rear ends in the sides of the casing. The forward free ends of the levers 21 are pivotally connected to the vertically-extending rods or bars 22, one at each side of the machine, which are pivoted to levers 23 similar to the levers 21. These four levers 21 and 23 are disposed near the corners of the movable register frame in which the registers or counters are mounted, said frame being supported at its lower end by links 76 pivoted in the casing so as to permit a movement of the register frame toward and from the front plate of the machine. In the vertical sides or plates 24 which, with the plates or bars 66 and 67 constitute the register frame, are arranged cam slots or guides 25 one for each of the levers 21 and 23, each of said levers carrying the pin or roller 26 passing into the respective cam slots. A movement of the curtain lever through the mechanism described, raises and lowers the levers 21 and 23 causing the pins or projections 26 to move through small arcs struck from their pivotal centers as they are moved up and down. The vertical movement of these pins compared with the arc through which they move, is so small as to be substantially in a vertical line, while the cam tracks will cause the register frame to be moved forward and back, being driven from each of its four corners so that it is moved uniformly throughout its whole length. The bars or rods 22 extend to the top and bottom of the machine and at the top are connected to a bar 27 for the purpose of resetting the slides for the irregular ballots, as will be explained. At the bottom of the machine these bars 22 are arranged to contact with the resetting bar 28 which operates to reset and return to first position all of the interlocking straps or rods and the regular candidate and question indicators of the machine. This resetting bar constitutes a controlling member inasmuch as it constitutes a means for controlling the movement of the indicators in addition to its function as a resetting means.

From the above described construction it will be seen that while the ends of the links 16 are engaged with the cut-away portion 15 of the cam plate, the bars 22 remain substantially stationary, holding the resetting bar locked in its lowermost position and locking all the voting devices as will be hereinafter explained and holding the register frame locked against movement, this being the position occupied by the parts when the curtain is removed from the front plate, so that there is no possibility of operating any of the voting devices while the front plate is exposed.

The vote indicating devices for regularly nominated candidates are the same as shown in my prior application aforesaid, embodying generally the indicators or keys 31 pivoted in the front plate 2 and having at the rear side of the latter, the plate 621 having the curved slot 62 and the shoulder or abutment 622 adapted to coöperate with the hooked end 63 of the register actuator or pallet bar 64, said plate 621 being further provided with an ear or projection 623 with which the straight ticket bar coöperates. (See Fig. 7.)

The interlocking mechanism controls operation of the irregular as well as the regular voting devices, such mechanism being shown in the present instance as embodying the rods or straps 34 attached to each of the regular candidate indicators and also to the irregular slides, extending to the lower portion of the machine and provided with interlocking wedges which are arranged on adjacent rods to break joints, the interlocking blocks or wedges being arranged between adjacent rods or straps, and the interlocking rods are as usual divided into office groups by the removable locking pins 36 passing through apertures in the blocks 37. Each of these groups embodies the rods or straps for the indicators devoted to candidates for the same office and one irregular slide, all as shown more fully in my prior application.

When it is desired to vote a straight ticket or indicate a ballot for each of the candidates nominated by a particular party, the straight ticket ballot indicator at the end of each horizontal row is moved, actuating the indicators in that row and drawing the wedges on the interlocking rods between the abutments in the channel 35.

In this present machine the interlocking rods or straps are provided with slots 44 through which passes the single resetting bar 28 shown in Fig. 1 adapted to be moved to restrict or reset the indicators when moved downwardly by the links or bars 22. This resetting bar is supported upon springs 281 secured to the casing and to the bar near its ends, and is provided at one end with a notch or recess 45, the lower side of which forms a projection adapted to coöperate with a stationary pin or roller 47, so that when said bar is moved to the left, Fig. 1, it will be locked from vertical movement. The other end of the resetting bar is provided with an inclined or cam surface 46 arranged to coöperate with the stud or collar 48 on the casing, said incline being so arranged relative to pins 48 and 47 that when the bar is moved down it will be given a longitudinal movement in the direction of the stud 47 sufficient to secure it at that end.

The locking bar is provided with recesses 57, one for each straight ticket bar, with which engage pins 58 carried on said straight ticket bars and when any one of the straight ticket bars is moved to the right (Fig. 1), its pin 58 immediately engages in the corresponding recess 57 in the bar 49, moving the latter laterally at that point. If the pin 58 is on one of the straight ticket bars above the point at which the spring 56 engages the locking bar, it will move the latter out at the top and the bottom will remain comparatively stationary, as described more fully in my prior application aforesaid, and this movement will carry the recess 54 away from the pin 55 releasing the bar 49 for upward movement, which will thus permit the resetting bar to rise. The lower end of bar 49 has an incline 51 which coöperates with a stationary pin 50 on the frame, and upward movement of the bar will cause it to move laterally, allowing the pin 50 to enter the recess 157 in the resetting bar 28, when the latter is moved upwardly. Thus, it will be seen that whichever straight ticket indicator is moved first, the resetting bar will be unlocked, permitting the further movement of the indicator and the voting of all the candidate indicators which are operated by it.

The irregular voting devices of the machine for permitting voting for persons not nominated are shown in Figs. 6 to 18 inclusive, and employ a paper roll, access to which is controlled by slides or doors, as shown in one of my prior patents. In the present arrangement I use the roll 77 of paper, mounted on a wooden shaft 78, as is shown in Figs. 2 and 6, the paper web 79 passing over a platen 80 and adapted to be wound up on a shaft 81, which is driven by a mechanism which I will now describe.

The shaft 81 is detachably connected at one end to a ratchet wheel 82 journaled in bearings in the casing and in a bridge 83 which also incloses a bar having a ratchet rack 84 at its upper end and a hook 85 on the lower end and above the latter, a pin 86 resting upon one of the links 21. The doors or slides 87 permitting access to the paper to enable the voter to write upon this paper the names of persons not nominated, are shown in Fig. 7, each being formed of a metal plate with an opening 88 in the lower part thereof and on the bottom is formed an upturned part or lug 89.

The upper ends of each of the interlocking rods or straps 90 of the irregular slides or doors are formed with a recess 91 therein, the upper shoulder forming a projection which engages with the upturned part or lug 89 on its slide. Carried on the back of the face plate of the machine is a series of pins 92, which, together with pins 93 serve as guides for the irregular doors or slides 97. The upper ends of the interlocking straps 90 when in normal position extend to and somewhat beyond the pins 92 and are guided in their vertical movements by the pins 92 and slots in the plate 94 through which they pass.

The doors or slides 87 are guided to move in a path at an angle to the line of movement of the interlocking straps, as is shown in Fig. 7, so that the upward movement of the door or slide will cause the interlocking strap to move vertically with it, until the lug 89 by a relative lateral movement, passes out of contact and disengages itself therefrom, leaving the slide free to move farther without it to uncover the paper web for writing or pasting the irregular ballot thereon. The disengagement of the slide or strap does not occur, however, until the interlocking rod or strap has moved far enough to prevent the operation of the regular candidate indicators with which it is grouped.

95 indicates a pivoted or rocking plate or wing extending horizontally across the ends of all the straps of the irregular slides, so that it is rocked to dotted line position shown in Fig. 6 by the upward movement of any one of them, and further movement of the interlocking rod or strap carries the end beyond the edge of the plate 95 thus preventing the latter from rocking back to normal position, and holding it locked in the position shown in dotted lines Fig. 6. The right hand end of the wing or plate 95 carries the arm 96, which engages with the bar carrying the hook 85, and as it rocks to dotted line position, shown in Fig. 6, the hook 85 is thrown forward until it passes under a pin on that side of the machine, which in this case is the end of the link 20 passed through the link lever 21 and beyond it, giving sufficient bearing for the hook 85 to engage therewith. The downward movement of the links or parts 20 and 21 pulls the hook 85 down, the teeth thereon engaging with and causing the rotation of the ratchet wheel 82 and the shaft 81 keyed thereto, thus drawing forward the paper web 79, a distance substantially equal to the length of the apertures covered by the slides and causing the presentation of a fresh surface of paper to the apertures closed by slides 87 on the front of the machine. This arrangement in which the hook ratchet 84—85 is normally stationary requires the movement of but few parts when the irregular covers or slides are not operated and enables the hook ratchet which I term an operating device to be connected with the reciprocatory member in the form of the lever 21 that is moved each time the machine is operated.

The shaft 81 is slotted at the end next to the ratchet wheel, into which extends a lug on the latter thereby making a detachable driving connection and the other end of said shaft has centered therein a pin which engages an aperture in a flat spring 181, secured to the casing so that by pressing the spring against the casing the shaft may be detached at both ends and removed when desired.

The shaft 78 carrying the paper roll 77 is slotted at each end and is mounted on the angle arms 97 pivotally connected to the platen 80, as shown in Fig. 11, the downwardly-extending ends of which prevent the lateral movement of the shaft, but by turning these arms to the dotted line position shown in Fig. 12, the shaft 78 may be removed from the machine. The roll of paper carried on said shaft is wrapped on a tube of cardboard or any similar material, which tube should be slightly larger in diameter than wooden shaft 78, so that it will be free to turn thereon without binding. The end of the paper may be secured to the shaft 81 in any suitable manner as for instance by forming a slot in the latter for a portion of its length and the end of the paper web may be cut off at the sides to present a point or narrow middle portion, which can be inserted through the slot, fastening it to the shaft so that it may be drawn forward thereby, when the shaft is turned as above described.

The ends of the interlocking straps 90 of the irregular balloting devices are slightly sprung, so that they have a frictional bearing on the plate 94 and the pins 92, which prevent them from dropping by gravity when they have been moved to voted positions. The resetting bars 27 and 28 being connected to the bars 22, the downward movement of the latter will cause the bar 27 to engage the upper ends of the slides which have been operated and return them to normal position while the main resetting bar 28 will draw down the interlocking straps of said slides and restore them.

In Figs. 9 and 10 I have shown means for keeping the irregular slides locked during the movements of the curtain lever and for this purpose I provide the bar 98 pivotally mounted on supports 99 and employ a spring 100, so connecting the bar with one of its supports that it will be held normally against the front plate of the machine, over the irregular balloting slides 87 as in Fig. 10 and prevent them from being raised. The bar 22 carries thereon a pin 101, which engages with the upturned end 102 of the bar 98 and rocks it to vertical position as shown in full lines Fig. 10 holding it completely disengaged from the irregular slides leaving the latter free to be raised. This engagement between the pin 101 and the upturned end 102 does not occur until the curtain lever has almost reached the end of its throw, when a very little further movement is sufficient to move the bar 98 sufficiently far to disengage it. The backward movement of the curtain lever releases the bar 98 at the beginning of its movement, allowing it to tilt forward again locking all the irregular slides against movement. When the slide or resetting bar 27 operates to push back the irregular doors or slides that have been operated, the lugs on the operated slides 87 as they pass the bar 98 press it out until they have passed it, when it closes in behind them, locking them all against upward movement until it is again withdrawn by the forward movement of the curtain lever.

At the beginning of the election it is the duty of the judges or inspectors of election to mark the web of paper as it shows on roll 82, with their signatures or some other characteristic mark and at the end of the election these marks will remain in view unless the irregular balloting device has been operated. If they have advanced, it is evident that the irregular balloting device has been operated, and the judges or inspectors of election will then wind several inches more of the paper on the roll 81, so that the paper between it and the platen at the end of the election will be wound thereon. The web of paper may then be cut, and the loose end of the part carried on the roll 81, may then be inserted between the cross bar 103 in the casing and the guide 104, as shown in Fig. 6.

The bar 103 is finished as a reading gage, as shown in Fig. 19 having numbers thereon corresponding to the lines of office rows and the irregular slides or doors and by pulling the paper web down as shown in Fig. 19, the paper web will bring the rows of names which may have been written thereon in line with the numbers on the reading gage, indicating the offices they have been voted for.

I preferably use paper which has been ruled between centers, the same distance as that between centers of the irregular balloting apertures through which the paper is exposed, thus furnishing an additional indication as to the offices for which the votes have been cast.

The laws of several States which permit the use of voting machines provide that the names of all the presidential electors of any party shall be placed in connection with a single key or voting device, so that one key and one counter serves for the electoral ticket of the whole part, and while it is very seldom that a voter wishes to split his electoral ticket, either by voting for one or more candidates nominated by another party, or by one or more candidates that have not been nominated by any party or both, but in case the voter does desire to split his ticket however, I provide a mechanism shown in Figs. 15 to 18 to enable this to be accomplished.

In this machine instead of requiring the voter to write the separate names of the electors upon the paper web 79, I provide a means by which a single printed or written ballot may be cast for all the electors and therefore the device by which this ballot is deposited is interlocked with the straps or rods of the indicators for presidential electors, which, in the present arrangement, is the first group next the straight ticket indicators. At the upper left hand end of the front plate 2, looking from the front, is provided an aperture 206, and back of this is arranged a bridge 107, in which is guided a slide or cover plate 207 provided with an operating lug or extension 106 and at the lower end with a lug or lip 208 adapted to coöperate with the shoulder 209 of the interlocking rod or strap 90. The upper end of the interlocking rod or strap is adapted to coöperate with a pin 210 so that when the rod or strap is raised by the slide, it will be released from the latter by its relatively lateral movement caused by the pin. Reference numeral 108 indicates a slide secured to bar 27 and having an aperture therein closed at the back by the bridge 107.

In using this device the voter prepares his ballot, containing the names of the electors for whom he wishes to vote, folds it up, places it inside of a metal casing or holder 105, (see Fig. 18) and then raises the slide 106 and inserts the holder in the opening. The slide 108 is reciprocated with every movement of the resetting bar 27, whether an irregular ballot is cast or not, but the slide 106 is moved only when it is raised by the voter and then it operates the interlocking strap 90 similar to the operation of any of the irregular balloting devices as described. The holder 105 with the irregular ballot contained therein can then be inserted in the opening whereupon the slide 106 will drop, thus concealing it. When the machine is reset, the slide 108 travels down, and as it passes below the bridge 107, the holder 105 drops out backward, due to the downward and backward inclination of the bottom of the slide. The holder 105 drops into any suitable receptacle inside of the machine such for instance as a cloth pocket or bag 205 suspended immediately under the point at which the holders 105 are normally discharged, as shown in Fig. 15.

I claim as my invention.

1. The combination in a voting machine, of a casing having an aperture, a movable cover or slide therefor having a projection, an interlocking strap with which the projection on the slide engages, said slide guided to move at an angle to the direction of movement of the strap, whereby the slide disengages itself from the latter after it has completed the interlocking.

2. The combination in a voting machine, of a casing having an aperture, a movable cover or slide therefor, an endwise movable interlocking strap with which the cover coöperates during a portion of its movements, said cover being movable at an angle to said strap and having a detachable connection therewith so arranged that the movement of the cover in one direction will move the strap and cause its disengagement therefrom.

3. The combination in a voting machine, of a casing having an aperture, a movable cover or slide therefor, an interlocking strap adapted to directly engage said strap and rigid guides for said cover and strap extending at an angle relatively whereby the movement of the cover will operate and release the strap.

4. The combination in a voting machine, of a casing having an aperture, a movable cover or slide therefor, and guides for said cover, an interlocking strap or rod, means for guiding it in a substantially straight line at an angle to the path of movement of the cover and coöperating projections between the cover and strap for causing the movement of the strap during a portion of the complete movement of the cover.

5. The combination in a voting machine, with a casing having an aperture, a movable cover or slide and guides for the latter, of an interlocking strap or rod, means for guiding the strap in a path extending at an angle to that in which the cover moves and engaging projections formed on the strap and cover respectively for causing the movement of the former when the latter is moved in one direction only.

6. In a voting machine the combination with the casing having apertures, doors for said apertures and a wing adapted to be operated by any of said doors, of a paper feeding roller, an operating device normally in engagement with said roller, a reciprocating member and connection between the wing and the operating device for moving the latter into engagement with the reciprocating member.

7. In a voting machine the combination with a paper feeding mechanism embodying a paper feed roller, an operating device for the roller normally in engagement therewith, a reciprocatory member with which the operating device is adapted to engage and movable means controlling access to the paper and operating when moved to cause the engagement of the operating device with the reciprocatory member.

8. The combination in a voting machine, of irregular balloting devices, comprising a paper feeding mechanism therefor, normally inactive means for causing the operation of said feeding mechanism, said means comprising a wing operated by any of the irregular balloting devices, the operation of which wing moves the normally inactive means to connect with the driving mechanism of the machine.

9. The combination in a voting machine of a casing having apertures, and slides or covers therefor, interlocking straps operated thereby, a paper feeding device, a wing operated directly by any of said straps to connect the paper feeding device with the driving mechanism of the machine, and hold it locked in engagement therewith.

10. The combination in a voting machine, of a paper feeding roll, a ratchet wheel by which the paper feeding roll is driven, a ratchet rack for driving the same, and normally in engagement therewith, said rack terminating in a hook which may be thrown into engagement with the driving mechanism of the machine.

11. The combination in a voting machine, of a paper feeding roll, a ratchet wheel thereon, a hook normally in engagement with said ratchet wheel at one end, and normally out of engagement with the driving mechanism of the machine at the other end, means for causing said hook to engage with the driving mechanism of the machine.

12. The combination in a voting machine, of a paper feeding roll, a ratchet wheel for driving said roll, a hook having at one end a ratchet rack normally in engagement with said ratchet wheel, and having a hook at the other end normally out of engagement with the driving mechanism of the machine, means for throwing said hook into engagement with the driving mechanism of the machine and holding it in such engagement to cause the feeding of the paper.

13. The combination in a voting machine, of a driving mechanism therefor comprising a pivoted lever, a paper feeding device embodying a hook normally inactive and provided with a pin engaging the lever, a pin on the lever with which said hook can engage to cause the driving of said hook through the operation of the driving mechanism of the machine.

14. The combination in a voting machine, of a casing having a plurality of apertures, a plurality of covers or slides therefor, interlocking straps for the covers, a paper feeding mechanism, a pivoted wing engaging with and locked by the interlocking straps when the covers are moved and operating to connect the feeding mechanism with the driving mechanism of the machine.

15. The combination in a voting machine, of means for registering ballots, a casing having apertures, covers or slides therefor, means for positively resetting said covers and independent means for locking the covers against movement after the registration of a ballot has begun.

16. The combination in a voting machine, embodying balloting mechanism and resetting devices, of an irregular balloting device comprising a casing having apertures, covers or slides therefor, means for holding inoperated covers locked against movement after the resetting of the machine has begun.

17. The combination in a voting machine, of a casing having apertures, an irregular balloting device embodying a plurality of covers or slides for the apertures, a rocking bar for locking said slides against movement and means for operating said bar to release said slides for voting operation.

18. The combination in a voting machine of a series of irregular balloting covers or slides, a rocking bar coöperating with the ends thereof to hold said covers locked against operation, means for operating said bar to release the covers, and means for subsequently resetting said bar to its normal position.

19. The combination in a voting machine, of a casing having apertures, a plurality of covers or slides therefor, a locking bar co-operating directly with the covers and normally holding them locked against movement, means actuated by the operating mechanism of the machine to move said bar out of locking position to permit the operation of the covers.

20. The combination in a voting machine, of a plurality of apertures, a plurality of covers or slides therefor, means for resetting operated covers and, means for holding unoperated slides locked against movement during the resetting of operated slides.

21. The combination in a voting machine of a casing having an aperture, regular ballot indicators, an irregular balloting device embodying a shield back of said aperture, a cover or slide for the aperture suitably interlocked with the regular indicators and a reciprocating receptacle arranged between said slide and said shield.

22. The combination in a voting machine, of an irregular balloting device, comprising the face plate of the machine having a suitable opening therein, a shield back of said opening, a slide closing said opening, and a carrier between said slide and said shield adapted to be reciprocated by the resetting mechanism of the machine.

23. The combination in a voting machine, of regular ballot indicators, an irregular balloting device comprising a plate having a suitable opening therein, a slide for closing said opening, said slide being suitably interlocked with the regular ballot indicators, a shield back of said opening, a ballot carrier reciprocating between the shield and said slide, and a receptacle for receiving a ballot holder on the reciprocation of the carrier.

24. The combination in a voting machine, of an irregular balloting device, comprising the face plate with a suitable opening therein, a slide for closing said opening, a shield back of said opening, a carrier moving between the slide and the shield, the lower side of said carrier being slanted rearward to discharge a ballot holder in that direction.

25. The combination with a voting machine, of a casing having apertures, a plurality of covers or slides therefor, interlocking devices for said covers and detachable connections between the covers and interlocking devices, means for resetting the interlocking devices, a locking device for the covers independent of the resetting devices and means actuated by the operating mechanism of the machine to move said bar out of locking position to permit the operation of the covers.

ALFRED J. GILLESPIE.

Witnesses:
J. E. GILLESPIE,
E. M. GILLESPIE.